United States Patent [19]

Callaway, Jr. et al.

[11] Patent Number: 5,555,452

[45] Date of Patent: Sep. 10, 1996

[54] PEAK AND VALLEY SIGNAL MEASURING CIRCUIT USING SINGLE DIGITAL-TO-ANALOG CONVERTER

[76] Inventors: Edgar H. Callaway, Jr., 11524 Clear Creek Pl., Boca Raton, Fla. 33428; Gary L. Pace, 17640 Lake Park Rd., Boca Raton, Fla. 33487; James D. Hughes, 5349 Cedar Lake Rd. #12-26, Boynton Beach, Fla. 33437

[21] Appl. No.: 439,910

[22] Filed: May 12, 1995

[51] Int. Cl.$^6$ .................................................. H04B 17/00
[52] U.S. Cl. ................. 455/226.2; 455/316; 324/103 P; 327/58; 327/62; 341/132
[58] Field of Search ............................. 455/226.1, 226.2, 455/226.4, 164.2, 182.2, 192.2, 208, 264, 263, 316, 258, 259; 324/103 P; 327/58, 62; 341/132, 164, 158, 138; 340/825.65

[56] References Cited

U.S. PATENT DOCUMENTS

| | | | |
|---|---|---|---|
| 4,165,508 | 8/1979 | Barter | 340/347 AD |
| 4,631,737 | 12/1986 | Davis et al. | 375/88 |
| 4,827,191 | 5/1989 | Chapman | 341/132 |
| 4,866,261 | 9/1989 | Pace | 341/138 |
| 5,025,251 | 6/1991 | Mittel et al. | 340/825.44 |
| 5,027,117 | 6/1991 | Yoshida et al. | 341/132 |
| 5,263,195 | 11/1993 | Panther et al. | 455/316 |
| 5,287,063 | 2/1994 | Izawa | 324/601 |
| 5,394,441 | 2/1995 | Motera et al. | 375/327 |

*Primary Examiner*—Reinhard J. Eisenzopf
*Assistant Examiner*—Lee Nguyen
*Attorney, Agent, or Firm*—D. Andrew Floam

[57] ABSTRACT

A peak and valley measuring circuit (40) featuring a single digital-to-analog converter (DAC) (100), a peak counter (110), a valley counter (120), and a comparator (130). The peak and valley measuring circuit (40) uses the peak counter (110) when detecting peaks of the recovered audio signal and the valley counter (120) when detecting valleys of the recovered audio signal. The DAC (100) is used in conjunction with one of the counters (110) or (120) depending on whether peaks or valleys are being detected, and is preferably a current-mode DAC.

20 Claims, 12 Drawing Sheets

PEAK AND VALLEY SIGNAL MEASURING CIRCUIT USING SINGLE DIGITAL-TO-ANALOG CONVERTER

FIELD OF THE INVENTION

This invention relates in general to the field of portable frequency modulation (FM) communication receivers, and more particularly to a circuit for detecting relative peak signal values.

BACKGROUND OF THE INVENTION

Portable communication receivers, such as selective call receivers, receive message signals transmitted from a base transmitter station. State of the art selective call receivers include microprocessors giving the receiver multifunction capabilities as well the ability to respond and display message information, including tone, voice, numeric, alphanumeric and graphics messages. This message information is transmitted using any number of coding schemes and message formats to frequency modulate a radio frequency signal.

The portable communication receiver receives and demodulates the FM radio frequency signal. A circuit known as a peak and valley measuring circuit is used to determine the maximum and minimum values of the demodulated signal. From these values a threshold may be determined and used to convert the message information in the demodulated signal to a digital signal for processing by the microprocessor. If a reference voltage representative of the desired RF carrier center frequency is available, this threshold may be employed in an Automatic Frequency Control (AFC) system to generate an estimate of the frequency error.

In prior art selective call receivers, the peak and valley measuring circuit comprises two digital-to-analog converters, one for controlling the detection of the minimum peaks (valleys) and one for controlling the detection of the maximum peaks (peaks). In applications where the symmetry between minimum and maximum peaks is important, such symmetry may be limited by the tracking error of the two digital-to-analog converters. In certain cases, any tracking error between the two digital-to-analog converters results in receiver center frequency offset.

It is desirable to provide a peak and valley measuring circuit which employs a single digital-to-analog converter to overcome the aforementioned problems.

DETAILED DESCRIPTION OF THE DRAWINGS

Figure 1:
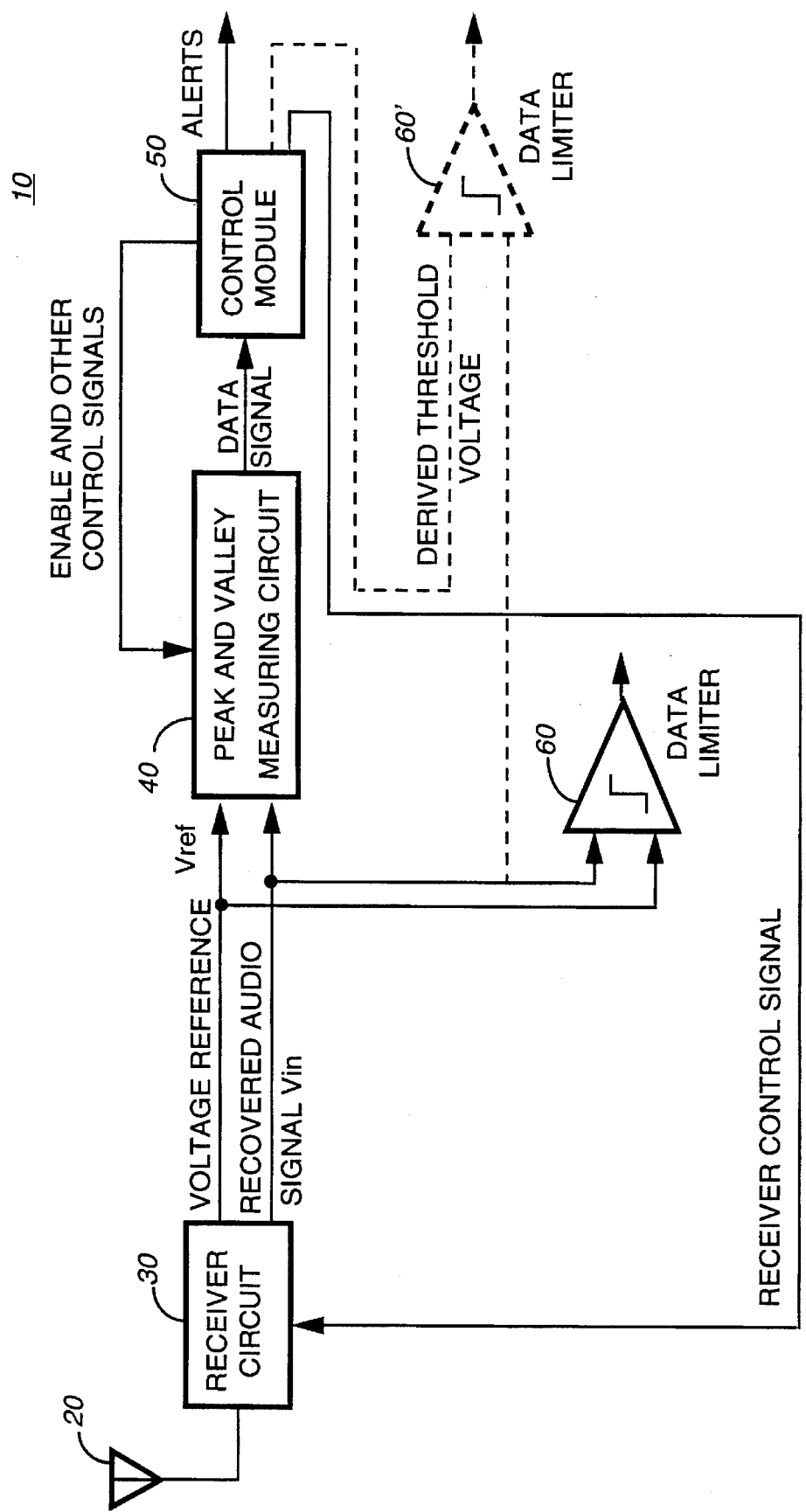
FIG. 1 is an electrical block diagram of a receiver according to the present invention.

FIG. 1 illustrates a receiver 10 comprising an antenna 20, a receiver circuit 30 and a peak and valley measuring circuit 40. The receiver circuit 30 includes, for example, mixing and demodulating circuitry to ultimately demodulate a signal detected by the antenna 20 and generate as output a demodulated signal and a voltage reference Vref that is representative of the desired RF carrier center frequency. The demodulated signal Vin is an analog signal at the output of the receiver circuit 30 and is also referred to as a "recovered audio signal". This signal is a band-limited waveform with a maximum value, called a "peak" and a minimum value, called a "valley". Voltage reference Vref is useful as a threshold voltage for a data limiter 60, shown in FIG. 1. The other input of the data limiter 60 is coupled to the demodulated signal Vin.

The receiver 10 further comprises a control module 50 which is coupled to the peak and valley measuring circuit 40 to adjust certain parameters in the receiver circuit 30, such as a mixer local oscillator frequency, to compensate for deviations from a center frequency of a received signal, as is well known in the art of automatic frequency control (AFC) receivers. The control module 50 also controls, via an Enable signal and other control signals, when the peak and valley measuring circuit 40 is made active to read peak and valley values. Further yet, when used with receiver designs that do not generate a reference voltage Vref representative of the desired carrier center frequency, the control module is useful to derive a threshold (voltage) based on the peak and valley values for a data limiter 60', shown in phantom in FIG. 1. The other input of the data limiter 60' is coupled to the demodulated signal.

Figure 2:
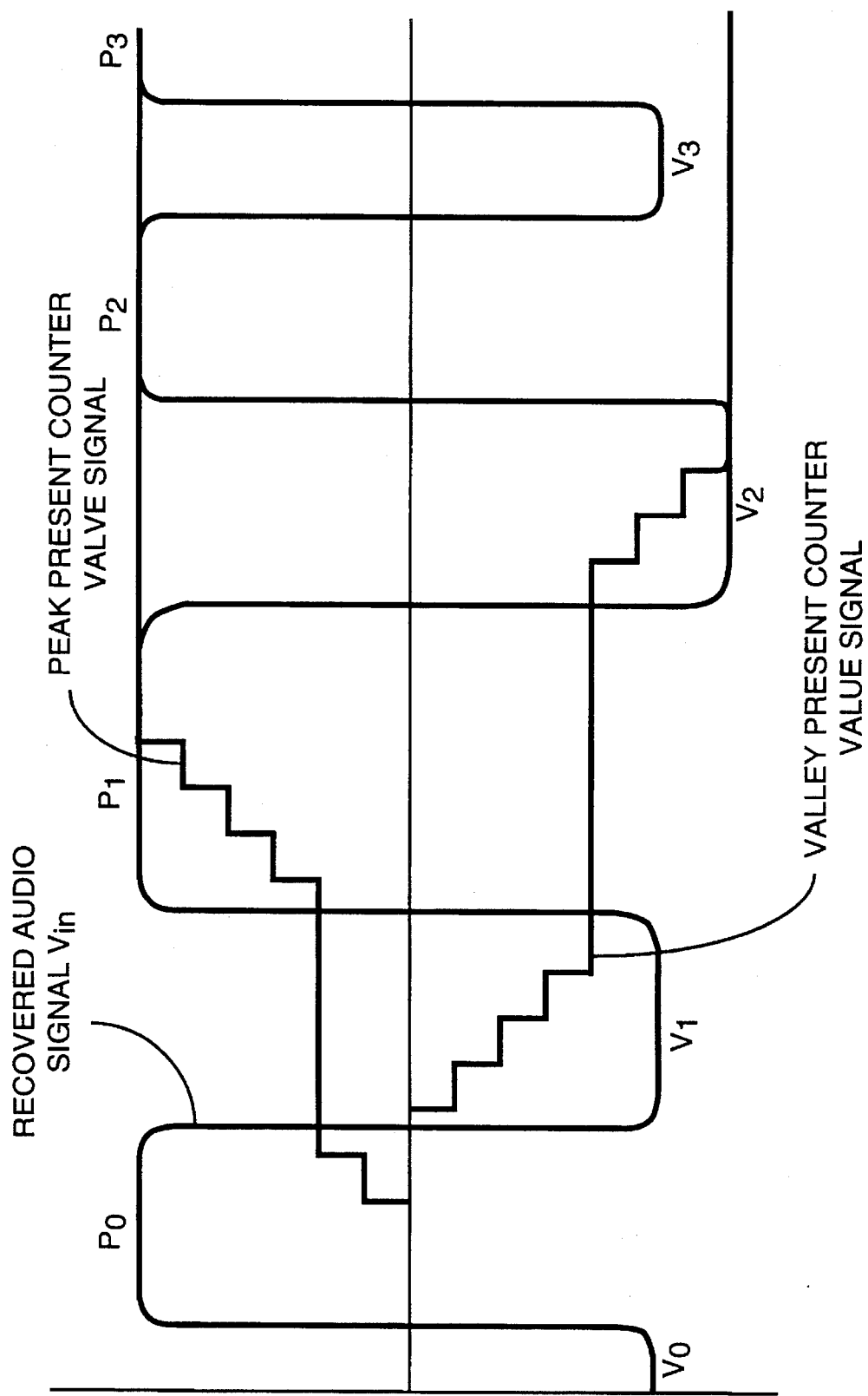
FIG. 2 is an graphical diagram of a recovered audio signal having peaks and valleys which are detected by the peak and valley measuring circuit according to the present invention.

FIG. 2 illustrates a recovered audio signal Vin and shows the peaks P and valleys V of the signal, which the peak and valley measuring circuit 40 measures, as will be explained hereinafter. In addition, shown in FIG. 2 are wave forms representing the (digital) peak present counter value signal and the (digital) valley present counter value signal, which are "stair-step" wave forms that correspond to the output of the peak and valley measuring circuit according to the present invention.

Figure 3:
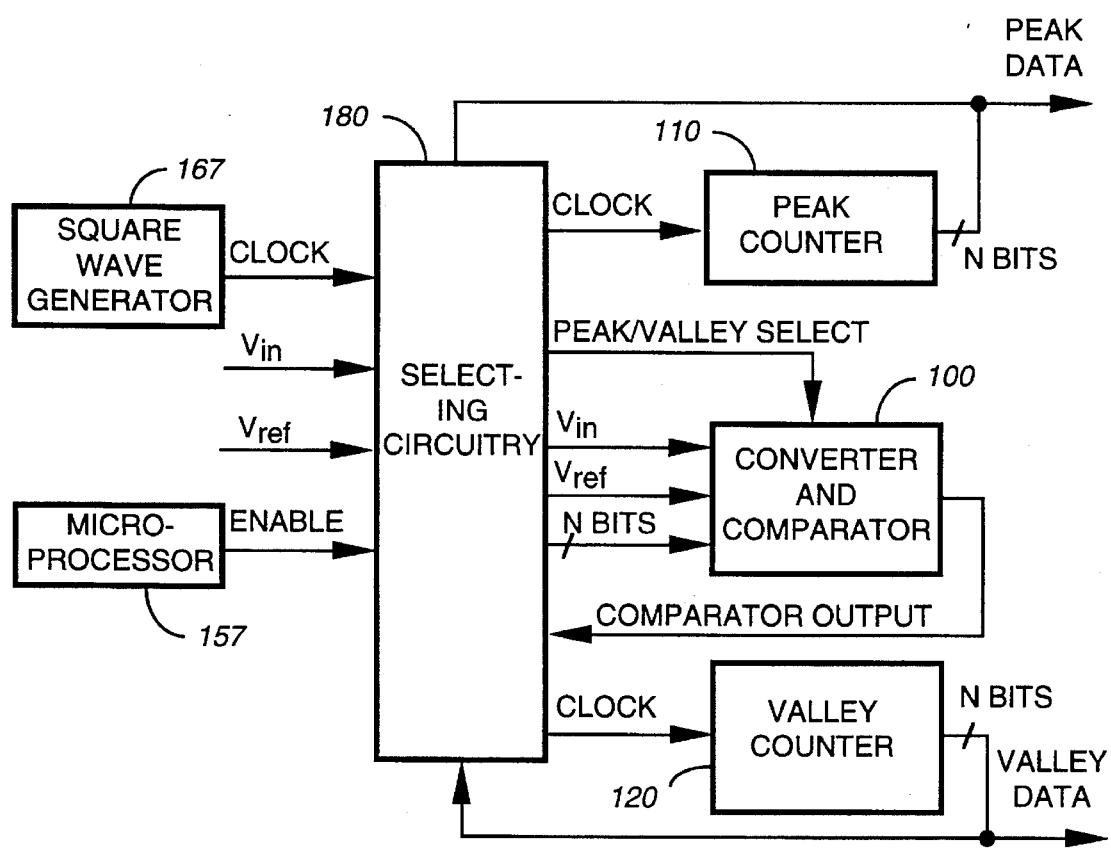
FIG. 3 is an electrical block diagram of the peak and valley measuring circuit according to the present invention.

Turning now to FIG. 3, the peak and valley measuring circuit 40 according to the present invention is shown in greater detail. The peak and valley measuring circuit 40 comprises a converter and comparator circuit 100 featuring a single digital-to-analog converter, a peak counter 110, a valley counter 120, and selecting circuitry 180. The converter and comparator circuit 100 will hereinafter be referred to as "converter and comparator 100," for brevity.

The peak counter 110 and valley counter 120 each have a clock input which receives a clock signal from selecting circuitry 180, and an n-bit digital output labeled PEAK DATA and VALLEY DATA which is coupled to selecting circuitry 180. PEAK DATA and VALLEY DATA are digital count values which are representative of the measurement of the peak and valleys, respectively. The digital output of the each counter 110 and 120 is a plurality of bits (n), the number of which depends on the particular application of the peak and valley measuring circuit 40. For purposes of generality, FIG. 3 shows that n bits are taken from the data output of each counter.

Converter and comparator 100 receives as input from the selecting circuitry 180 the analog input signal Vin, the voltage reference Vref, a peak/valley select signal (also called a "counter select signal"), and a digital input of n bits coupled to the digital output of the peak counter 110 and the digital output of the valley counter 120 by means of selecting circuitry 180. The peak/valley select signal controls converter and comparator 100 when Vin is greater than Vref (peak) and when Vin is less than Vref (valley). The output of converter and comparator 100 is coupled to the selecting circuitry 180, and is a signal indicating the relative level of Vin compared to a level represented by the n-bit digital input to the converter and comparator 100.

The selecting circuitry 180 has inputs which are coupled to a clock signal generated by a square wave generator 167, the recovered audio signal Vin, a reference source for voltage reference Vref, an Enable signal supplied by a microprocessor 157, and the output of the converter and comparator 100, and the digital outputs of the peak counter 110 and valley counter 120. The selecting circuitry, as mentioned above, generates outputs which are coupled to the inputs of converter and comparator 100 and to the clock inputs of the peak counter 110 and valley counter 120, for selecting for operation the peak counter 110 when a level of the analog signal is greater than a reference to enable the peak counter to measure the peak of the analog signal, and selecting for operation the valley counter 120 when the level of the analog signal is less than the reference to measure the valley of the analog signal. With reference to FIG. 2, the selecting circuitry 180 triggers the peak counter 110 to count at a current peak only when the current peak is greater than a prior peak and triggers the valley counter 120 to count at a current valley only when the current valley is less (larger in magnitude) than a prior valley.

The peak and valley measuring circuit 40 is designed to use the peak counter 110 when measuring peaks of the recovered audio signal and to use the valley counter 120 when measuring valleys of the recovered audio signal. The converter and comparator 100 is used in conjunction with either peak counter 110 or valley counter 120 depending on whether peaks or valleys are being measured.

Figure 4:
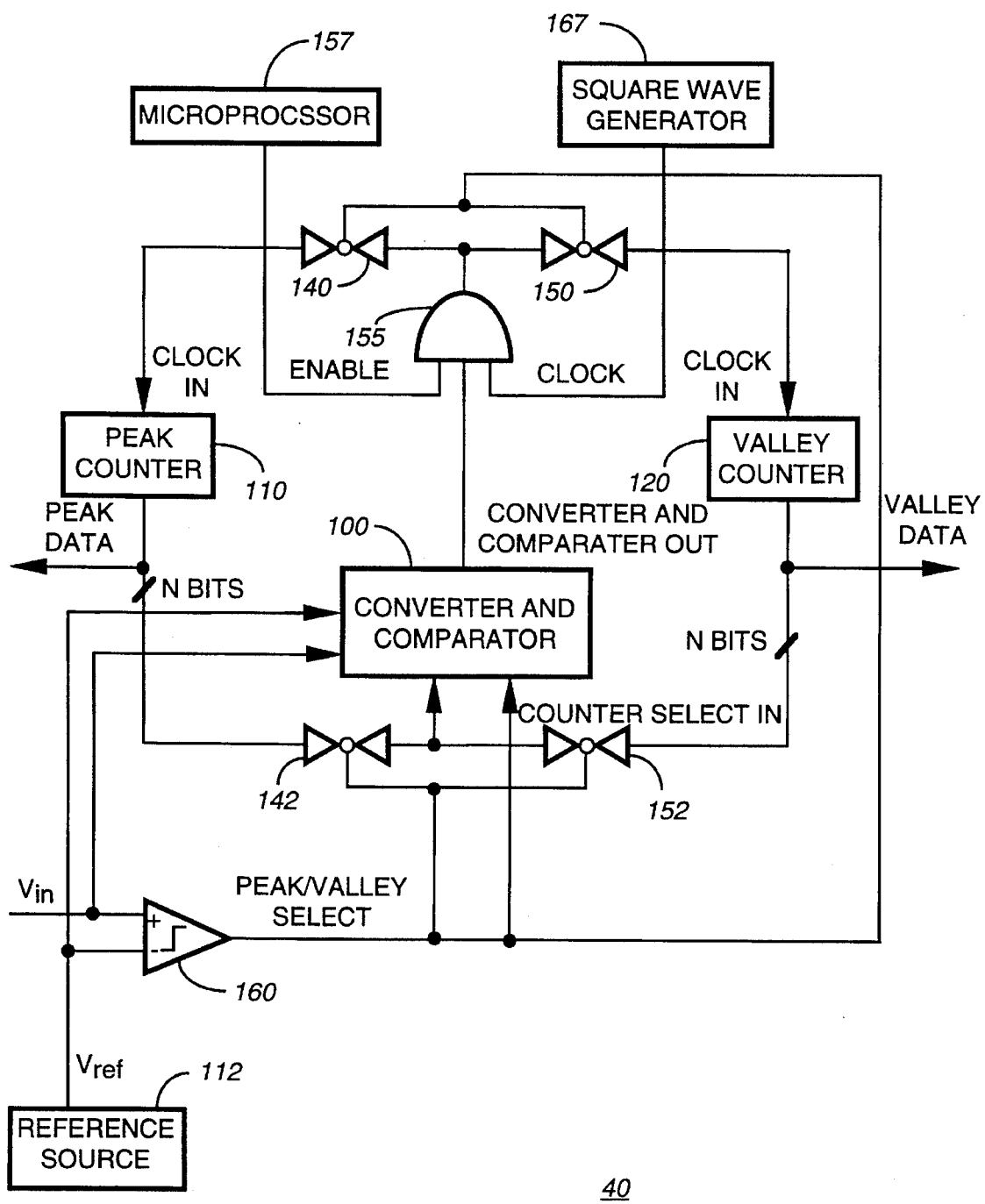
FIG. 4 is a more detailed electrical block diagram of the peak and valley measuring circuit according to the present invention.

A preferred embodiment of the present invention is shown in FIG. 4. The selecting circuitry 180 comprises a first set of transmission gates 140 and 142; a second set of transmission gates 150 and 152; an AND gate 155; and comparator 160.

The converter and comparator 100 comprises a single digital input coupled to the digital output of the peak counter 110 through transmission gate 142 and to the digital output of the valley counter 120 through transmission gate 152. In addition, the peak/valley select signal is coupled to a counter select input of converter and comparator 100 from comparator 160. Converter and comparator 100 also receives as input the recovered audio signal Vin, and reference voltage Vref supplied by reference source 112. The output of converter and comparator 100 (called the converter and comparator output) is coupled to an input of AND gate 155.

A plurality of transmission gates are provided to control which counter is activated. A first set of transmission gates 140 and 142 when closed, couple the peak counter 110 to the converter and comparator 100 and form a first counter loop. A second set of transmission gates 150 and 152, when closed, couple the valley counter 120 to the converter and comparator 100 and form a second counter loop.

An AND gate 155 is provided at the output of the converter and comparator 100 which receives as input, the Enable signal generated by an external control means, such as a microprocessor 157, which is embodied as the control module 50 shown in FIG. 1, for example; a Clock signal generated by the square-wave generator 167; and the output of the converter and comparator 100. The output of AND gate 155 is coupled to the peak counter 110 via transmission gate 140 and is coupled to the valley counter 120 via transmission gate 150.

The AND gate 155 controls the coupling of the Clock signal to the peak counter 110 or the valley counter 120, depending upon which is active. In either case the AND gate 155 couples the Clock signal to the counter circuit so long as the Enable signal is high and the output of the converter and comparator 100 is high. While an AND gate 155 is useful, it should be understood that another circuit device which is responsive to the Enable signal and converter and comparator 100 output is also useful.

To determine which counter is made active, a comparator 160 is provided, a negative input of which is coupled to voltage reference Vref (which corresponds to Vref of FIG. 2) and a positive input of which is coupled to the recovered audio signal represented by Vin. The comparator 160 generates as output peak/valley select signal which takes on one of first and second levels. The first level enables operation of the peak counter 110 if the level of the audio signal Vin is greater than the voltage reference Vref, and the second level which enables operation of the valley counter 120 if the level of the audio signal Vin is less than the voltage reference Vref.

If the recovered audio signal Vin is greater than Vref, then the peak/valley select signal closes transmission gates 140 and 142. On the other hand, if the recovered audio signal Vin is less than Vref, then the peak/valley select signal closes transmission gates 150 and 152.

Specifically, transmission gates 140 and 142 are responsive to a "high" signal to close; transmission gates 150 and 152 are responsive to a "low" signal to close. If Vin is greater than Vref, the comparator 160 generates a high peak/valley select signal which closes transmission gates 140 and 142, while opening transmission gates 150 and 152. Conversely, if Vin is less than Vref, the comparator 160 generates a low peak/valley select signal which opens transmission gates 140 and 142, while closing transmission gates 150 and 152.

Figure 5:
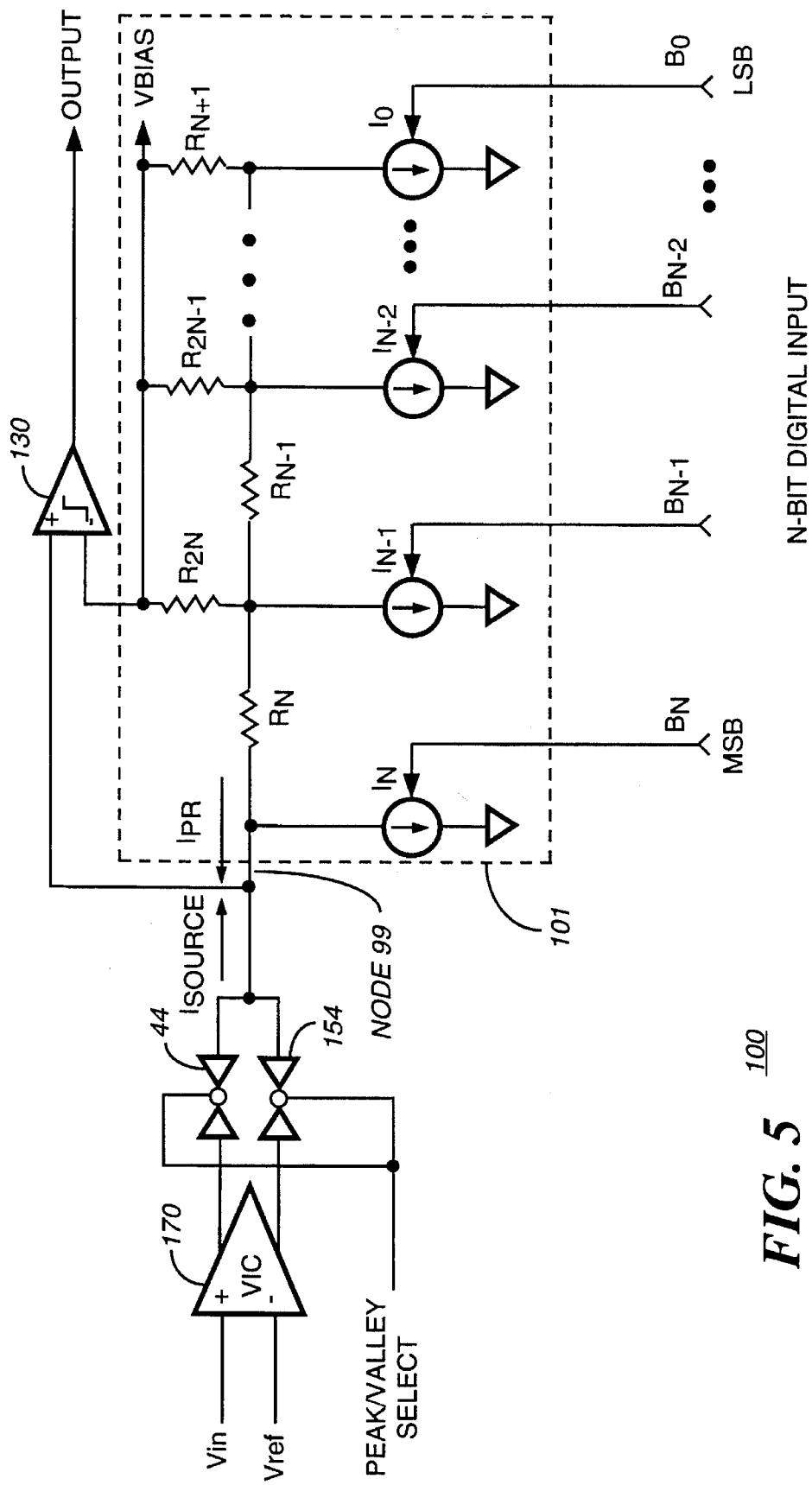
FIG. 5 is an electrical schematic diagram of a converter and comparator circuit of the peak and valley measuring circuit according to a first embodiment of the present invention.

In accordance with a preferred embodiment of the converter and comparator 100, shown as FIG. 5, the converter and comparator circuit 100 comprises a single DAC 101 and a voltage-to-current converter (VIC) 170. The VIC 170 has first and second inputs and first and second outputs, and is provided to change the voltage difference between Vin and Vref to a differential current output, which is an analog current signal. The output sourcing current is selected by activation of the appropriate transmission gate 144 or 154, under control of the peak/valley select signal from comparator 160, depending on whether the input analog signal Vin is greater than or less than Vref.

Using a single converter and comparator 100 makes it necessary to invert (change the sign of) the input signal when one of the counters is active. The inversion task is more easily implemented for current signals.

It is desirable to use transmission gates to perform the switching task between inverted and non-inverted input signals, due to their small size and low current consumption. The switching task is more easily implemented for current signals since voltage drops across transmission gate on-resistance has less effect on current signals than on voltage signals. In addition, a voltage-mode digital-to-analog converter (DAC) requires a range and linearity which is more challenging to implement with the low supply voltage available in some portable communications receivers, for example. Furthermore, the operational amplifier normally required in a voltage-mode DAC can be eliminated if current signals are used. Consequently, the VIC 170 is useful because it reduces the sources of error and simplifies the design of the peak and valley measuring circuit 40.

The DAC 101 shown in FIG. 5 is of the R-2R ladder type; those skilled in the art realize that other types of DAC structures capable of producing an output current are also useful in implementing the present invention. DAC 101 comprises equal-valued resistors $R_n \ldots R_1$ and equal valued resistors $R_{2n} \ldots R_{n+1}$, forming the R-2R ladder; and current sources $I_n \ldots I_0$ controlled by binary digital signals $B_n \ldots B_0$, the n-bit digital input.

The current Isource is coupled to the DAC output current Ipr at node 99. The programmed DAC output current Ipr, for a given n-bit digital input, is defined to be the DAC output current that flows when node 99 is forced to be at a voltage equal to Vbias. When Isource is greater than Ipr, the voltage at node 99 is greater than Vbias. Similarly, when Isource is less than Ipr, the voltage at node 99 is less than Vbias. Therefore, to compare Isource to Ipr, the inverting (negative) input of comparator 130 is coupled to bias voltage Vbias, and the non-inverting (positive) input is coupled to node 99. Whenever Isource is greater than Ipr, the positive input of comparator 130 will be at a potential above Vbias, and the output of the comparator 130 will be high. Conversely, whenever Isource is less than Ipr, the positive input of comparator 130 will be at a potential below Vbias, and the output of the comparator 130 will be low.

Figure 6:
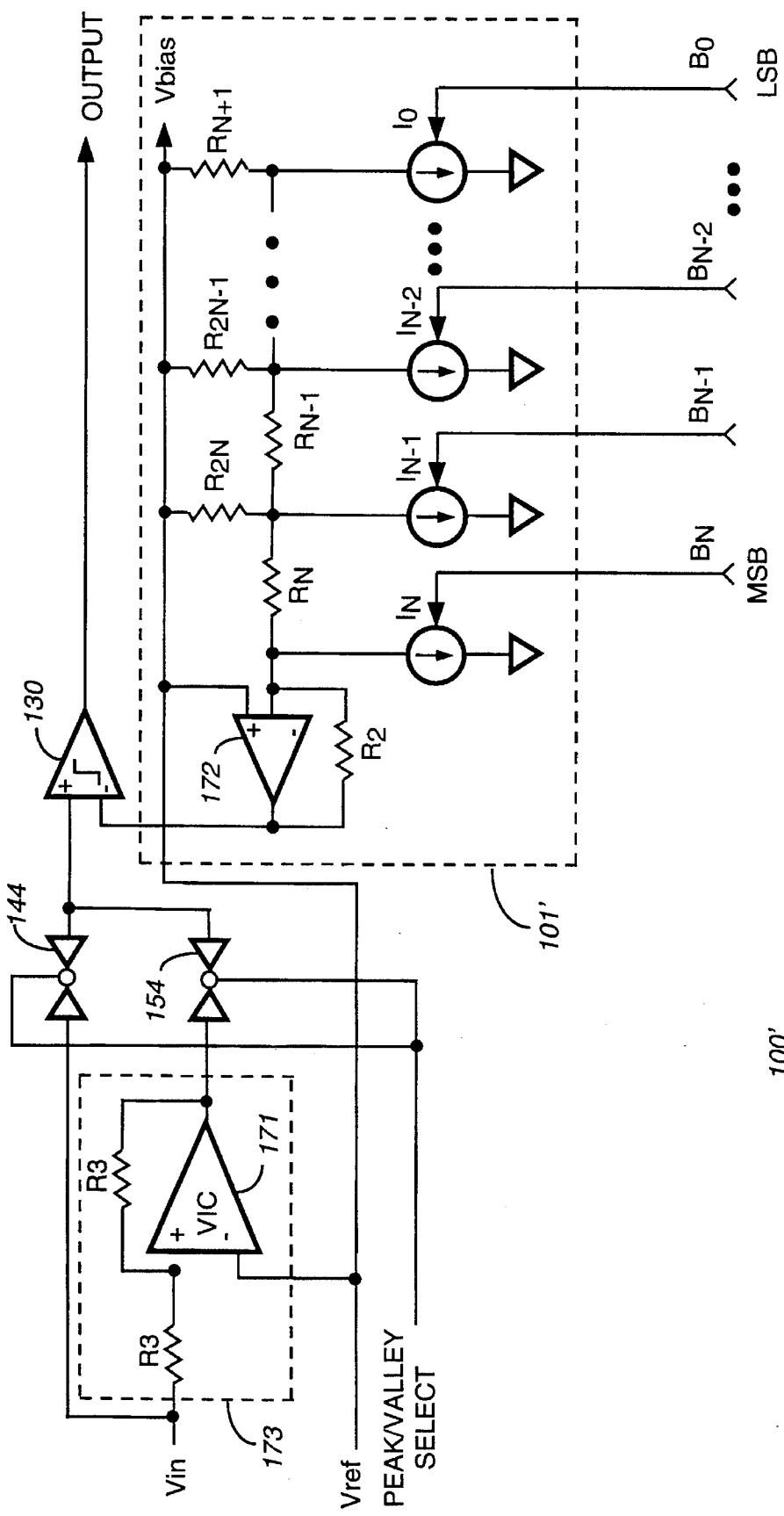
FIG. 6 is an electrical schematic diagram of a converter and comparator circuit of the peak and valley measuring circuit according to a second embodiment of the present invention.

With reference to FIG. 6, a second embodiment of the converter and comparator is converter and comparator 100', employing a voltage-mode DAC 101'. The operation of voltage-mode DAC 101' is well known to those skilled in the art. It receives as input voltage reference Vref, and the n-bit digital input from selecting circuitry 180, and produces an analog voltage output at the output of operational amplifier 172, coupled to the negative (inverting) input of comparator 130. Recovered audio signal Vin is coupled to transmission gate 144 and the input of voltage inverting circuit 173, which is comprised of equal-valued resistors R1 and R3 and operational amplifier 171. This embodiment of voltage inverting circuit 173 is only an example; the function of voltage inverting circuit 173 may be implemented in other ways. The voltage inverting circuit 173 employs reference voltage Vref as a reference, by coupling Vref to the positive (non-inverting) input of operational amplifier 171. The output of voltage inverting circuit 173 is coupled to transmission gate 154.

Transmission gates 144 and 154 are controlled by the peak/valley select signal so that Vin is coupled to the positive (non-inverting) input of comparator 130 when Vin is greater than Vref, and the output of voltage inverting circuit 173 is coupled to the positive (non-inverting) input of comparator 130 when Vin is less than Vref. The output of comparator 130 will be high whenever its positive (non-inverting) input is greater than the output of voltage-mode digital-to-analog converter 101', and low whenever its positive (non-inverting) input is less than the output of voltage-mode digital-to-analog converter 101'.

The operation of each counter loop in FIG. 4 is the same. Consider the case where Vin is greater than Vref. The peak/valley select signal, generated by comparator 160, will be high, triggering transmission gates 140 and 142, as well as transmission gate 144 (FIG. 5 or 6) to close. This forms a counter loop comprising peak counter 110, DAC 101 (or 101'), comparator 130, and AND gate 155. Similarly, when Vin is less than Vref, a counter loop comprising valley counter 120, DAC 101 (or 101'), comparator 130, and AND gate 155 is formed.

Figure 7:
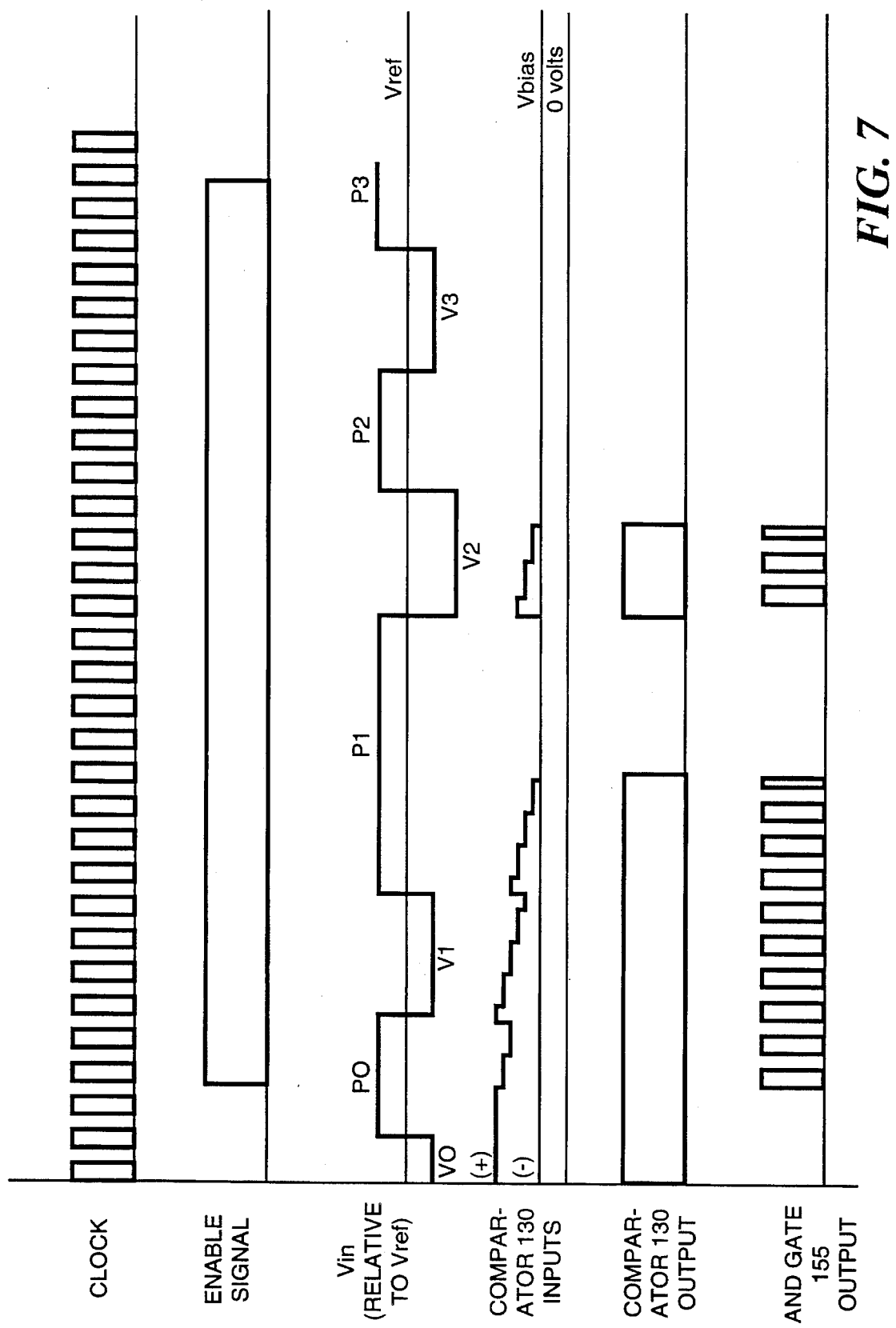
FIG. 7 is a timing diagram of various signals of the peak and valley measuring circuit according to the present invention.

With reference to FIG. 7, and employing the preferred embodiment converter and comparator 100 shown in FIG. 5, the operation of the peak and valley measuring circuit 40 is as follows. Peak counter 110 and valley counter 120 are reset prior to the start time of the diagram.

Before the Enable line goes high, peak counter 110 and valley counter 120 remain in the reset state. This forces the programmed DAC output current, Ipr, to be 0 which, in turn, forces the voltage at node 99 (FIG. 5) to be above Vbias. Since the negative input of comparator 130 is coupled to Vbias, the output of comparator 130 is high. With the Enable line low, however, the output of AND gate 155 remains low.

When the Enable line goes high, the output of AND gate 155 becomes a copy of the Clock signal. At this point, Vin is greater than Vref, so comparator 160 has closed transmission gates 140, 142, and 144, and opened transmission gates 150, 152, and 154. The output of AND gate 155 is thus coupled to the clock input of peak counter 110.

With each rising edge of the Clock signal, peak counter 110 increments by I and the output of peak counter 110, called the peak present counter value signal, is as shown in FIG. 2. The peak present counter value signal is a current (in time) measurement of the peak of the signal being measured. In turn, this increases the programmed DAC output current, Ipr, and so lowers the voltage at node 99. As long as this voltage is greater than Vbias, the output of comparator 130 remains high, and the output of AND gate 155 continues to copy the Clock signal. The programmed DAC output current, Ipr, is representative of the digital present count values of the peak counter 110 or valley counter 120, as appropriate.

When Vin transitions to below Vref, comparator 160 opens transmission gates 140, 142, and 144, and closes transmission gates 150, 152, and 154. This stops peak counter 110, by removing the Clock signal, and starts valley counter 120. Valley counter 120 increments in a manner similar to that of the peak counter 110 and generates as output a valley present counter value signal also shown in FIG. 2, until Vin transitions to above Vref. Comparator 160 then toggles the transmission gates again, and peak counter 110 continues to count from its previous value. Peak counter 110 counts until the positive input of comparator 130 reaches Vbias. The output of comparator 130 then goes low, forcing the output of AND gate 155 low, and stopping the peak counter 110. Thus, the output of the comparator 130 is an output signal which indicates the level of the signal being measured with respect to the programmed DAC output current, Ipr.

Both counters remain stopped until Vin transitions below Vref again. Comparator 160 toggles the transmission gates again, and the valley counter 120 continues to count from its previous value. This is shown in FIG. 2 where V1 is smaller (in magnitude) than V2. Valley counter 120 counts until the positive input of comparator 130 reaches Vbias. The output of comparator 130 then goes low, forcing the output of AND gate 155 low, and stopping valley counter 120.

Since the positive input of comparator 130 has reached Vbias for both the peak and valley counter loops, the output of comparator 130 does not go high again unless the peak value P1, P2, P3, etc., of Vin increases above a previous maximum value or the valley value decreases below a previous minimum value.

The peak counter 110 is triggered to count at a current peak only when the level of the analog signal is greater than a signal representative of the digital present count value of the peak counter 110 and the valley counter 120 is triggered to count at a current valley only when the level of the analog signal is greater (in magnitude) than a signal representative of the digital present count value of the valley counter 120.

Otherwise, if the current peak or current valley is not greater in magnitude than a prior measured peak or valley, peak counter 110 and valley counter 120 may be read. When the Enable line goes low, the peak and valley measuring circuit 40 is no longer capable of counting.

Thus, the AND gate 155 is responsive to a first level (high) of the output signal of the comparator 130 to couple the Clock signal to either of the peak counter 110 or valley counter 120, and is responsive to a second level (low) of the output signal of the comparator 130 to inhibit coupling of the Clock signal to either of the peak counter 110 or valley counter 120.

The peak and valley measuring circuit 40 according to the present invention is useful in many types of receivers in a variety of devices. It should be further understood that the peak and valley measuring circuit 40 is optionally embodied as a digital signal processor (DSP) in certain applications where desirable.

The peak and valley measuring circuit 40 is useful in any application where it is desirable to measure the peaks and valleys of an analog signal. As suggested, this is quite often the case in a receiver device. For example, one use of the peak and valley measuring circuit 40 is to read the peak and valley values, periodically or as the occasion requires, during the operation of a zero-intermediate frequency FM (frequency modulation) receiver in order to determine frequency error (difference between the frequency of a signal mixed with the received signal and the frequency of the received signal). This is determined by computing the difference between the peak and valley values, divided by 2 and comparing this value to zero, in the case of a zero-intermediate frequency receiver circuit. This is computed by a microprocessor in the control module 50, for example (FIG. 1). In response, the control module 50 generates a RECEIVER CONTROL signal which, in this example, is a frequency error signal that adjusts an oscillator frequency (signal mixed with the received signal) in the receiver circuit 30.

In addition, the peak and valley values are useful to determine a frequency deviation parameter which is the sum of peak and valley values, divided by 2. Again, the frequency deviation is computed by a microprocessor or other device.

Further yet, the peak and valley measuring circuit is useful to determine a threshold reference value for a data limiter 60' (FIG. 1) by computing the mean of the peak and valley values. This is useful in many types of receiver circuits.

Figure 8:
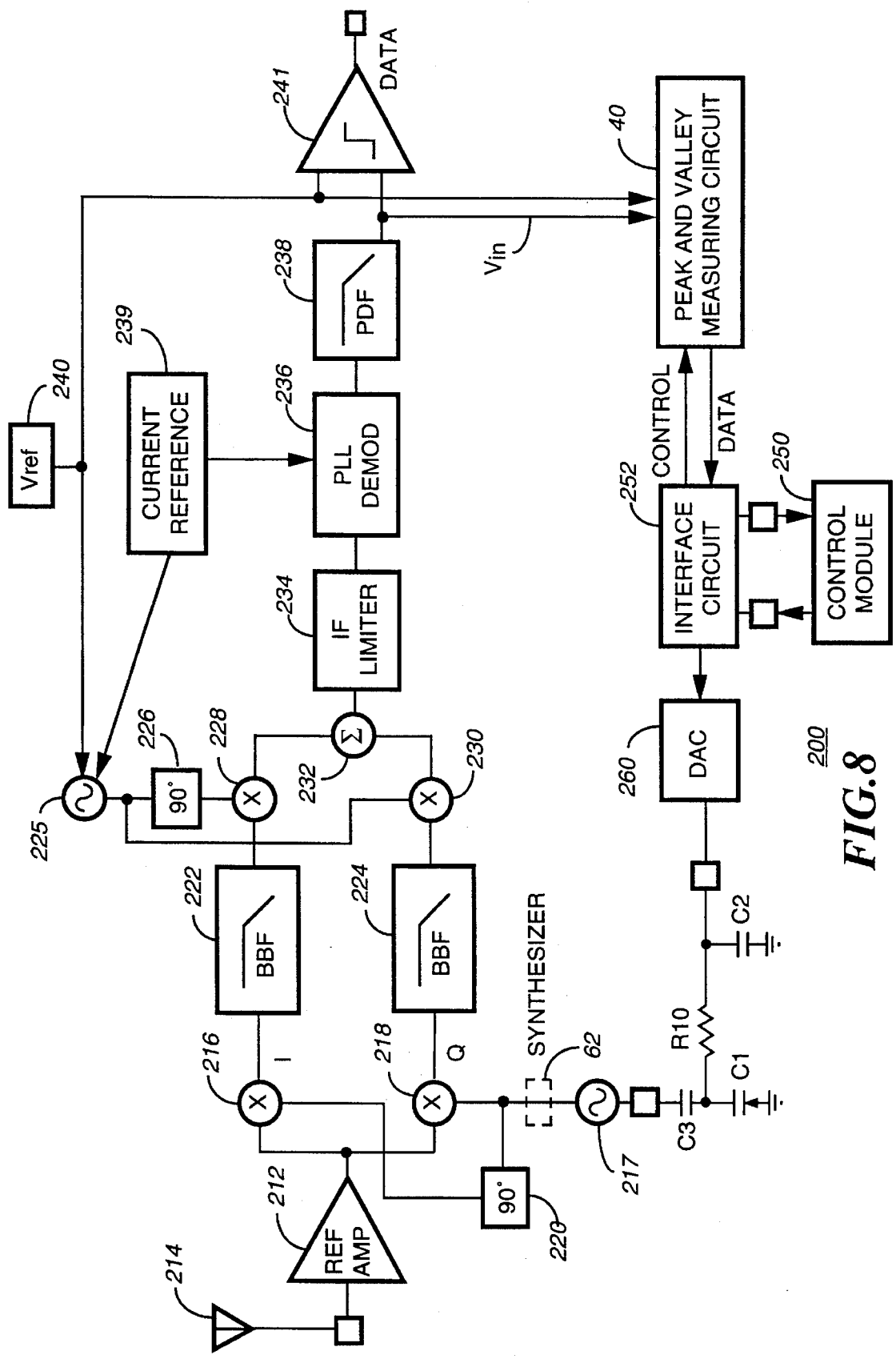
FIG. 8 is an electrical block diagram of a zero-intermediate frequency automatic frequency control receiver circuit according to the present invention.

FIG. 8 illustrates utility of the peak and valley measuring circuit 40 in a zero intermediate frequency (ZIF) receiver circuit 200. The ZIF receiver circuit 200 is a modification of a well known Barber type receiver circuit, and is the subject of the co-pending and commonly assigned application entitled Zero-IF Receiver with Tracking Second Local Oscillator and Demodulator Phase Locked Loop Oscillator. The ZIF receiver circuit 200 is preferably fabricated as a single integrated circuit (IC), and is configurable as an AFC receiver.

The ZIF receiver circuit 200 comprises a radio frequency (RF) amplifier 212 for amplifying a signal detected by an antenna 214. A first local oscillator 217 is provided to generate a first local oscillator signal for a first of a pair of mixers 216 and 218, and a 90° phase shifter 220.

Mixer 216 mixes the amplified RF signal with the 90° phase shifted version of the first local oscillator signal, to ultimately recover an in-phase (I) component of the received signal. Mixer 218 mixes the amplified RF signal with the first local oscillator signal to ultimately recover a quadrature (Q) component of the received signal. The outputs of the mixers 216 and 218 are coupled to base band filters (BBF's) 222 and 224, respectively.

A second pair of mixers is provided which includes a second local oscillator 225, a 90° phase shifter 226 and mixers 228 and 230, for the I and Q components, respectively. The outputs of the BBF's 222 and 224 are connected to the inputs of the mixers 228 and 230, respectively. The I and Q base band components are mixed up in frequency to an intermediate frequency for demodulation, by mixers 228 and 230. The output of the mixers 228 and 230 are added by the summer 232 and the output of the summer 232 is the output of the mixing section, which is an intermediate frequency signal.

An IF limiter 234 is connected to the output of the summer 232.

A phase locked loop demodulator 236 is connected to the output of the IF limiter 234 and demodulates the output signal of the IF limiter 234 to recover the frequency modulated signal, which is ultimately filtered by the post detection filter (PDF) 238. The output of the phase locked loop demodulator 236 is the recovered audio signal. The output of the PDF 238 is the recovered frequency modulated signal, represented as Vin.

The output of the PDF 238 is coupled to a data limiter 241 and to the peak and valley measuring circuit 40. The data limiter 241 generates a digital output which is the information carried by the frequency modulated signal.

A voltage reference (Vref) 240 provides a voltage reference signal representative of the desired RF carrier center frequency for the second local oscillator 225, data limiter 241 and for the peak and valley measuring circuit 40.

A current reference circuit 239 provides a current reference signal to the second local oscillator 225 and the phase locked loop demodulator 236.

The peak and valley measuring circuit 40 is coupled to receive as input the voltage reference VREF and the output of the PDF 238 Vin. The output of the peak and valley circuit 40 is coupled via an interface circuit 252 to the control module 250, which is similar to control module 50 shown in FIG. 1. The control module 250, which is a microprocessor, for example, generates receiver control signals based on the peak and valley values generated by the peak and valley measuring circuit 40 to adjust the frequency of the first local oscillator signal generated by the first local oscillator 217. The control signals generated by control module 250 are coupled through interface circuit 252 to a DAC 260 which converts the digital control signals to analog signals and couples these signals through resistor R10 to a varactor or voltage variable capacitor C1, which in turn is capacitively coupled by capacitor C3 to the first local oscillator 217. This completes the AFC loop.

Figure 9:
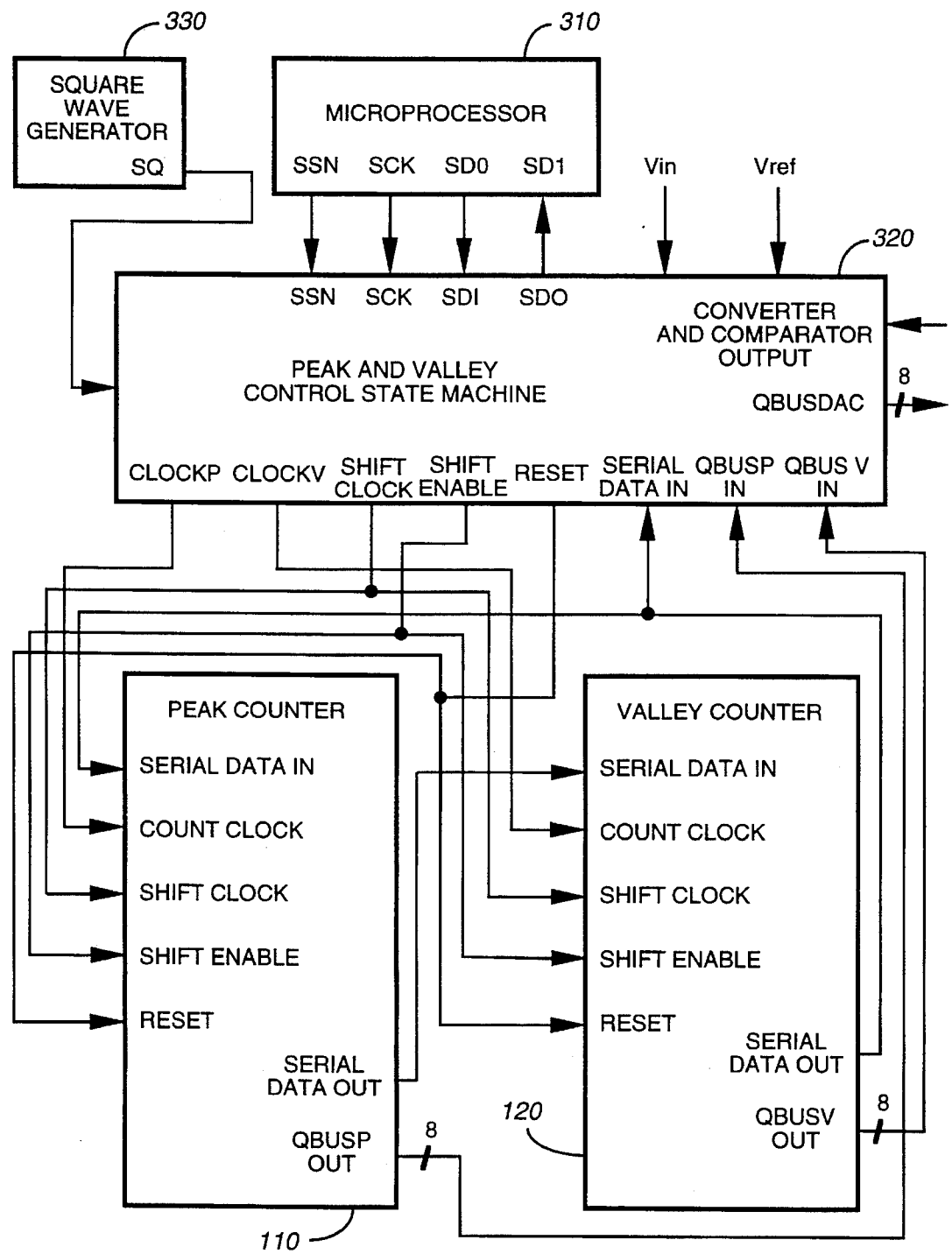
FIGS. 9 and 10 are electrical block diagrams of a digital circuit implementation according to the present invention.

Turning now to FIG. 9, a digital implementation of the selecting circuitry serving as the control for the peak and valley counters, will be described. The selecting circuitry 180 (FIG. 3) is embodied as peak and valley control state machine 320 in FIG. 9, which receives as input the output of the converter and comparator circuit 100 (FIG. 4) and several outputs of a microprocessor 310, which will be described in greater detail hereinafter. Microprocessor 310 also has the functional responsibilities as microprocessor 157 shown in FIG. 4, and those functions are shown and described in greater detail herein.

The peak and valley control state machine 320 provides the necessary control signals into the circuitry to implement the following functions: peak and valley reset, peak and valley measurement on/off, peak and valley read measured data. The peak/valley select signal is generated internally on the basis of the analog signal Vin and the reference Vref.

The commands for the functions described above are generated by the microprocessor 310. The microprocessor is interfaced to the peak and valley control state machine through a simplified version of a Motorola Serial Peripheral Interface, for example. Other interface busses or protocols are also useful. The peak and valley control state machine is selected or enabled when the slave select line SSN transitions from high (1) to low (0). The microprocessor clock signal SCK then begins to toggle and proceeds to clock the commands into the peak and valley control state machine 320. The function commands are each defined with particular pre-defined bit strings, with 8 bits making up one byte. For example, the peak and valley reset command is one byte in length, the peak and valley measurement on/off is one byte in length and the peak and valley read data is one byte in length. The peak and valley read data command requires the microprocessor to clock the peak and valley control state machine for two additional bytes to shift the data out. The function command bit strings are serially clocked into the peak and valley data input line SDI on 320.

The peak and valley control state machine 320 comprises first and second clock outputs ClockP and ClockV, a shift clock output, a shift enable output and a reset output. In addition, the peak and valley control state machine comprises a peak counter input QbusP and a valley counter input QbusV.

Data read from the peak and valley measurement circuit is serially clocked out of the peak and valley control state machine 320 via port SDO. When the command transfer is complete the microprocessor will raise the slave select line SSN thereby disengaging the peak and valley control state machine. The microprocessor clock SCK is then stopped.

Once the particular command has been clocked (serially shifted) into the peak and valley control state machine 320, it decodes the command and based on its particular function along with the current inputs of the state machine proceeds generates internal peak and valley measurement control signals to achieve the desired functionality.

Specifically, upon loading the peak and valley reset command the internal Reset signal, shown as an output signal of the peak and valley control state machine 320 and an input to the peak and valley counters 110 and 120, transitions high thereby resetting the peak and valley counters 110 and 120 to zero and re-initializing the peak and valley control state machine 320. The Reset signal transitions low when the microprocessor 310 has finished clocking the one byte command and raises the slave select line SSN.

Figure 10:
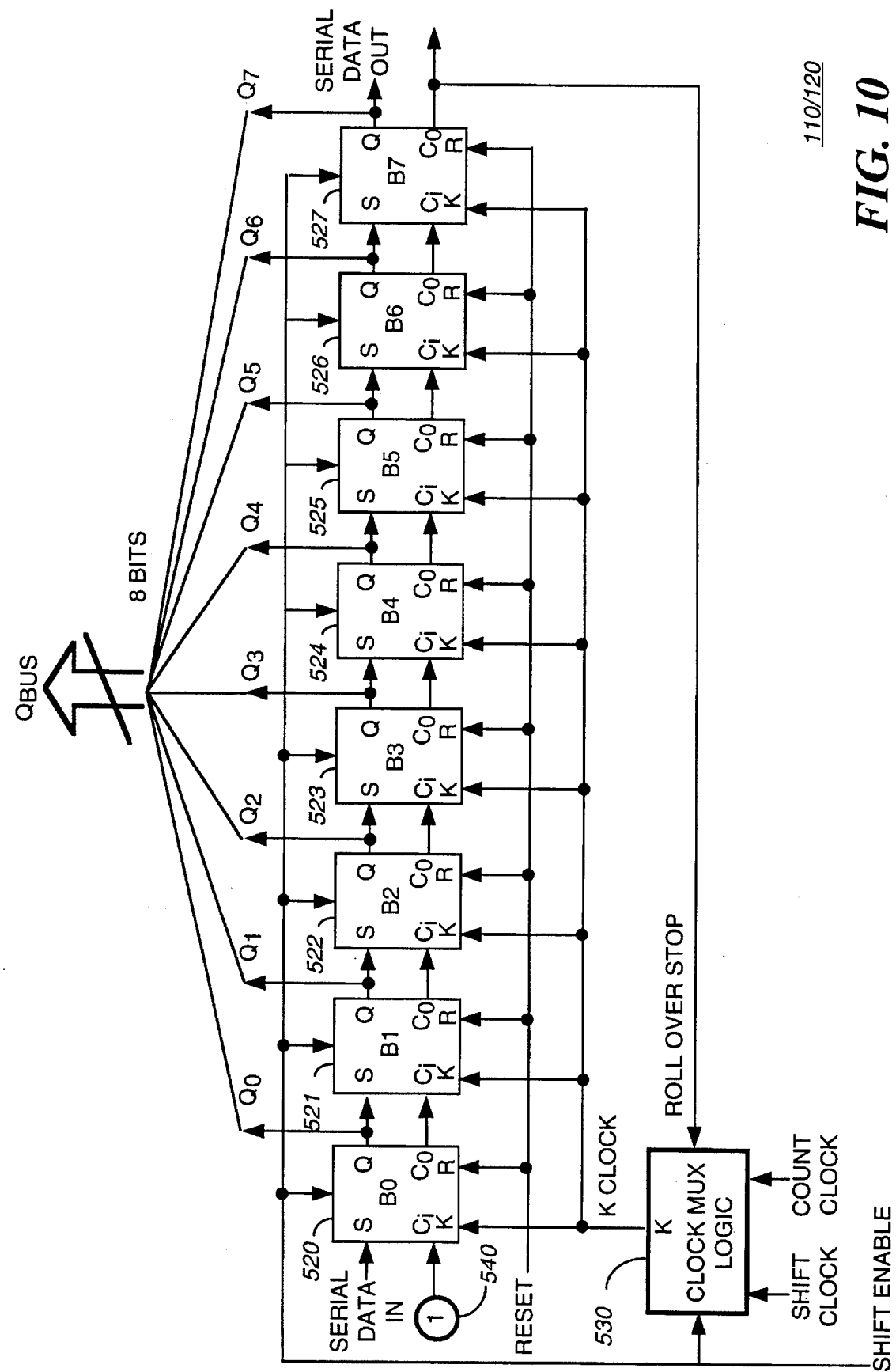

Before describing the second and third commands, further details of the operation of the peak and valley counters 110 and 120 will be discussed with reference to FIG. 10. FIG. 10 shows an 8-bit counter, but it is appreciated that it is representative of an N-bit counter, where N is any integer of appropriate value.

The peak and valley counters 110 and 120 shown in FIG. 9 are unique in that each functions as a 8-bit up-counter when the shift enable input signal is low (0) and functions as a serial shift register when the shift enable signal is high (1). The inputs to each bit are shift in, Sin; carry in, Ci; clock input K, shift enable and reset R. The outputs from each bit are Q and carry out, Co. The counter bit stores in a flip-flop one digital bit and is defined for illustration here as Q. Therefore Q is the current stored digital bit. When shift enable is low and clock K transitions from low to high the carry in, Cin input is added to its internal Q bit. The new internal Q bit is presented at Q port and any carry overflow from the single bit is presented to the Co bit. This adding operation is a traditional one bit digital adder with carry out. However, when the shift enable is held high and the clock K transitions from low to high the counter bit loads the value it receives on the Sin input line directly into the internal Q bit and the bit that was stored in the internal Q bit at the previous low to high transition is presented at the Q port. The counter bit is now a single bit serial shift register. The shift enable input line thus toggles operation between a count mode and a shift mode.

The peak counter 110 and the valley counter 120 each comprises a serial data input, a count clock input, a shift clock input, a shift enable input, a reset input, a serial data output and a Qbus output. The peak counter 110 has QbusP output which is the digital output of the peak counter 110 and the valley counter 120 has QbusV output which is the digital output of the valley counter 120. The serial data output of the valley counter 120 is coupled to the serial data input of the peak counter 110. Similarly, the serial data output of the peak counter 110 is coupled to the serial data input of the valley counter 120.

The 8 bit peak and valley counters are built by several bits 520–527. When assembled in this fashion with the counter bits all in count mode the carries Co propagate through the system to form a ripple carry adder. The input carry to bit B0 520 is held high by a source 540 so as to always add one to the counter. Thus when the shift enable is low the clock K will toggle and the counter will count up. When the shift enable is held high and the clock K toggles, the bits shift from left to right one bit position which each clock K cycle. New data may enter the serial data in port, clocking through the counter bits, and shifting out the serial data out port.

The clock multiplex logic circuit 530 is provided to allow the count clock to drive the K clock line and when shift enable is high allows the shift clock to drive the K clock line. While two clocks are shown available here for circuit flexibility, in other embodiments of the circuit one clock could be used.

The peak and valley counters 110 and 120 measure signals in the count mode and shift out their data in the shift mode. In the present embodiment, this circuit design has advantages of saving implementation area on a integrated circuit by using a combined counter/shift register design. The same circuit block can perform the counting and also the reading (shifting out) of the data. Traditional digital circuitry would perform parallel loads of the counter data to separate shift registers which would double the size of the circuit.

Before the counter in FIG. 10 could roll over (count from 11111111 to 00000000), the roll over stop signal would stop the clock K via logic circuitry in the clock multiplex logic circuit 530 and the counter would remain at 11111111 until reset. When the Reset line transitions from low to high as shown in FIG. 10, the counter bits are all reset to 0 and the counter is cleared.

The Qbus output shown in FIG. 10 is an 8 bit parallel bus consisting of the Q outputs of the individual bits. This corresponds to is the previous bus defined as n-bits shown in FIGS. 3 and 4 and is used to move the peak and valley counter data to the converter and comparator 100. The Qbus output represents the current or present count value loaded in the counter.

The peak and valley measurement on/off command starts and stops the measurement process previously described. After the peak and valley "on" command is loaded into the peak and valley control state machine 320, it transitions the shift enable signal low to put the counters in the count mode in preparation for measuring peaks and valleys.

The square wave generator 167 generates the signal SQ which is the clock signal used in the count mode. The peak and valley control state machine 320 multiplexes the SQ clock signal to clockP (to clock the peak counter) or clockV (to count the valley counter) depending on whether Vin is greater than Vref. The peak and valley control state machine 320 guarantees that complete clock cycles on clock P, clock V, and shift clock always begin with the rising edge output. This is important because the initial peak and valley on/off command, decisions from the selecting circuitry, and the SQ clock signal all arrive asynchronously with respect to each other. The coordination of the various commands and clock signals is necessary to eliminate the risks that the peak and valley counters 110 and 120 could acquire a metastable state and corrupt their internal data.

Finally, when the peak and valley off command is loaded into the peak and valley control state machine, it finishes the current clock cycle on either ClockP or ClockV. The peak and valley control state machine 320 then transitions the shift enable signal high to put the counters in the shift mode in preparation to read the measured peaks and valleys. The peak and valley control state machine 320 then on the proper rising edge multiplexes the microprocessor clock SCK to the shift clock. Shift clock, as described above, is an input of the peak counter 110 and the valley counter 120.

The shift clock is allowed to clock the counters which are now configured as shift registers for 16 cycles. The two 8 bit counters in FIG. 9 have been tied together to form one 16 bit shift register. The serial data out of the peak counter 110 is coupled to the serial data of the valley counter 120. The serial data out of the valley counter 120 is coupled as an input to the peak and valley control state machine 320 via the serial data input. The peak and valley control state machine transfers the data to the microprocessor 310 via serial data out SD0. The serial data out of valley counter 120 is also connected to the serial data in of the peak counter 110. This allows the counters to shift the data out to the microprocessor and back into themselves which provides for a non-destructive read operation. The command is complete after the 16 clocks and microprocessor raises the slave select line SSN.

Figure 11:
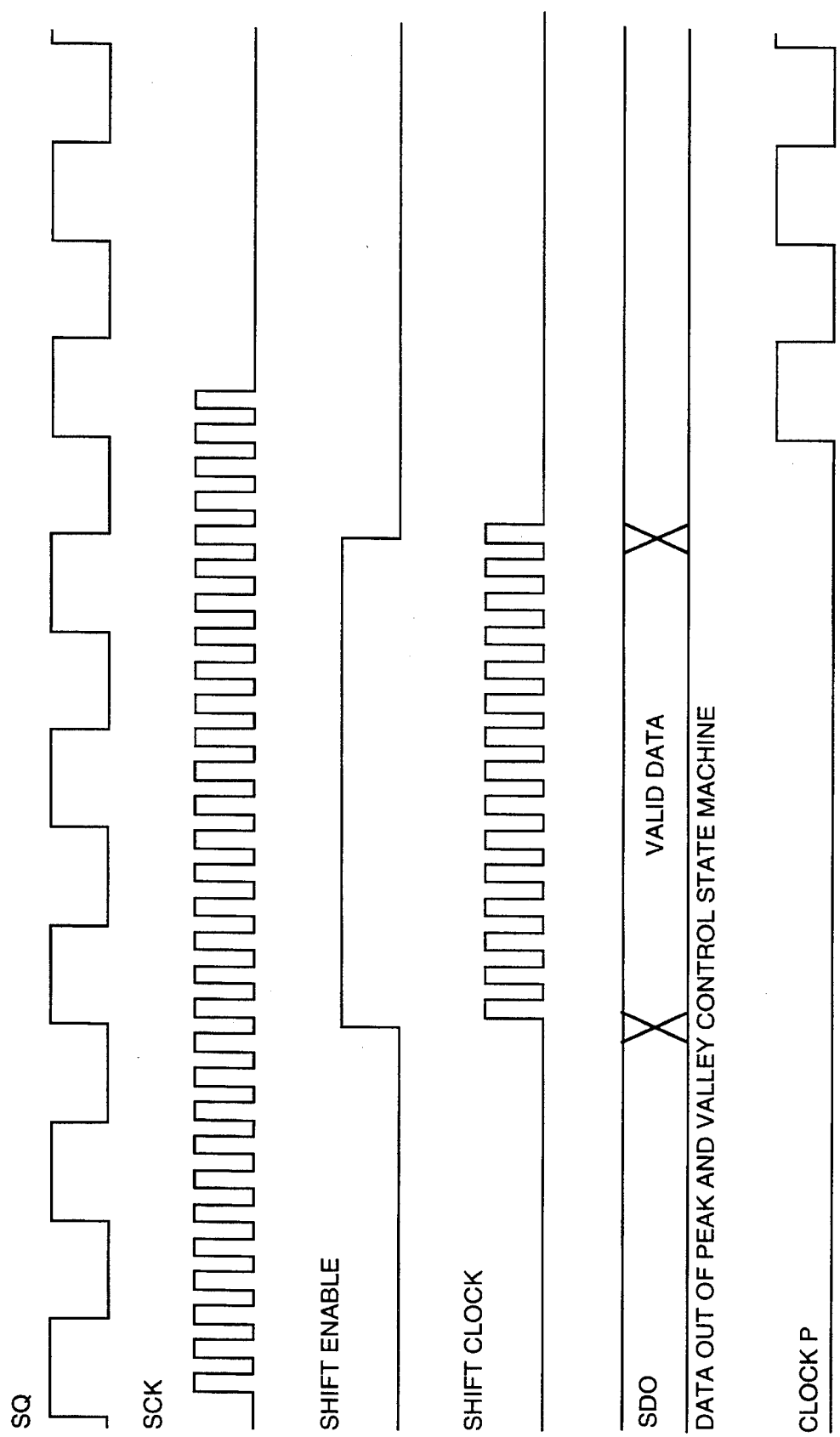
FIG. 11 is a timing diagram illustrating timing of various control signals in accordance with the digital circuit implementation shown in FIGS. 9 and 10.

To illustrate the relationship of the internal signals and an example of control, reference is made to FIG. 11. The first signal shown is the output of the square wave generator SQ. The following signal is the microprocessor 310 SPI clock SCK. The SQ clock and SCK clock are both inputs to the peak and valley control state machine 320. The first 8 clock cycles of the SCK clock load the command into the peak and valley control state machine. The command to read the peak and valley counters 110 and 120 is implemented. The shift enable line is lowered. The shift clock is then allowed to clock the peak and valley counters 110 and 120. Data is shifted from the counters into the peak and valley control state machine 320 and out to the microprocessor 310. At the end of the read command the SSN line is raised and the shift enable is lowered by the peak and valley control state machine 320. However, the control state machine will not multiplex the SQ clock to clockP until the proper beginning of the clock period. This is one example of how the peak and valley control state machine 320 protects the clock inputs of the peak and valley counters from entering a metastable condition.

Figure 12:
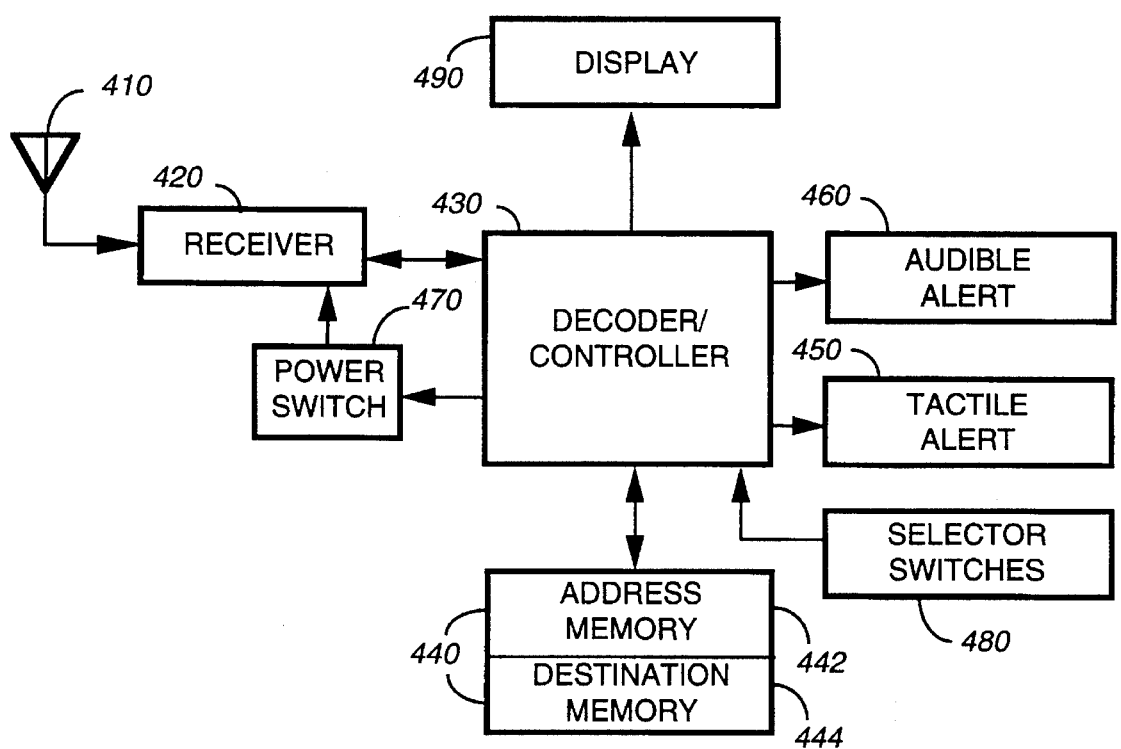
FIG. 12 is an electrical block diagram of a selective call receiver in accordance with the present invention.

FIG. 12 shows a selective call receiver 400, and is an example of a device that uses the peak and valley measuring circuit 40. The selective call receiver 400 comprises an antenna 410, a receiver 420 such as the ZIF receiver circuit 200 of FIG. 8 or the receiver 10 of FIG. 1, a decoder/controller 430, and a code plug memory 440 including an address memory 442 and a destination memory 444. The code plug memory 440 is programmable by a remote programming device, as is well known in the art. In addition, various alert devices are provided, such as the tactile alert 450 and the audible alert 460. A power switch 470 is also provided to activate and de-activate certain components of the selective call receiver 400 under control of the decoder/controller 430. The decoder/controller 430 is, for example, a microprocessor that serves both the purposes of receiver control, like control module 50, and data decoding functions as required in selective call receivers.

User input into the selective call receiver is by way of selector switches 480. A menu of various user programmable features is accessed via the switches, through the use of menu information displayed on the display 490. The selector switches 480 allow, for example, adjustment of user programmable features.

The above description is intended by way of example only and is not intended to limit the present invention in any way except as set forth in the following claims.

What is claimed is:

1. A peak and valley measuring circuit suitable for measuring peaks and valleys of an analog signal, the peak and valley measuring circuit comprising:

a clock generator for generating a clock signal;

a reference source for providing a reference;

a first counter having a clock input for receiving the clock signal and counting in response thereto, and providing a digital present count value at a digital output which is representative of a current measurement of a peak of the analog signal;

a second counter having a clock input for receiving the clock signal and counting in response thereto, and providing a digital present count value at a digital output which is representative of a current measurement of a valley of the analog signal;

a converter and comparator circuit having inputs coupled to the analog signal, to the reference and to the digital outputs of the first and second counters, and having a counter select input, the converter and comparator circuit having a converter and comparator output which is an analog signal representative of the digital present count value of the first counter or the second counter; and a selecting circuit having inputs coupled to the reference, to the analog signal, to the clock generator, to the digital outputs of the first and second counters, and to the converter and comparator output, and having outputs coupled to the clock inputs of the first and second counters, the selecting circuit selecting for operation the first counter when a level of the analog signal is greater than the reference, and selecting for operation the second counter when the level of the analog signal is less than the reference, the selecting circuit further controlling the first counter means to count at a current peak only when the level of the analog signal is greater than a signal representative of the digital present count value of the first counter and controlling the second counter to count at a current valley only when the level of the analog signal is less than a signal representative of the digital present count value of the second counter.

2. The circuit of claim 1, wherein the selecting circuit comprises a comparator for comparing the level of the analog signal with respect to the reference and generating a counter select signal coupled to the converter and comparator circuit which enables coupling of the clock signal to the first counter if the level of the analog signal is greater than the reference, and which enables coupling of the clock signal to the second counter if the level of the analog signal is less than the reference.

3. The peak and valley measuring circuit of claim 2, wherein the selecting circuit comprises a first set of transmission gates and a second set of transmission gates, the first set of transmission gates including:

a transmission gate coupled between the clock generator and the clock input of the first counter, a transmission gate coupled between the digital output of the first counter and the converter and comparator circuit;

the second set of transmission gates including:

a transmission gate coupled between the clock generator and the clock input of the second counter, and a transmission gate coupled between the digital output of the second counter and the converter and comparator circuit; and wherein the comparator is connected to the first and second sets of transmission gates, whereby the comparator triggers the first set of transmission gates to close if the level of the analog signal is greater than the voltage reference and triggers the second set of transmission gates to close if the level of the analog signal is less than the voltage reference.

4. The peak and valley measuring circuit of claim 2, wherein the converter and comparator circuit comprises a single digital-to-analog converter (DAC) having an input and an output.

5. The peak and valley measuring circuit of claim 4, wherein the DAC is a current mode DAC and generates as output a DAC output current, wherein the converter and comparator circuit comprises:

a voltage-to-current converter having first and second inputs and an output, the first and second inputs of the voltage-to-current converter being coupled to the analog signal and the voltage reference, respectively, the voltage-to-current converter generating as output an analog current based on a voltage difference between the analog signal and the reference; and a comparator having a first input coupled to the output of the voltage-to-current converter and to the DAC output current, and a second input coupled to a voltage bias, and an output corresponding to the converter and comparator output.

6. The peak and valley measuring circuit of claim 5, wherein the output of the comparator of the converter and comparator circuit is high when the analog current at the output of the voltage-to-current converter is greater than the DAC output current, and when the analog current at the output of the voltage-to-current converter is less than the DAC output current, the output of the comparator of the converter and comparator circuit is low.

7. The peak and valley measuring circuit of claim 6, wherein the voltage-to-current converter comprises first and second outputs, wherein the converter and comparator circuit further comprises first and second transmission gates coupled to the first and second outputs of the voltage-to-current converter, respectively, the first transmission gate coupled to the counter select signal of the selecting circuit to close and couple the first output of the voltage-to-current converter to a node to which the DAC output current is connected when the analog signal is greater than the reference, and the second transmission gate coupled to the counter select signal of the selecting circuit to close and couple the second output of the voltage-to-current converter to a the node to which the DAC output current is connected when the analog signal is less than the reference.

8. The peak and valley measuring circuit of claim 4, wherein the DAC is a voltage mode DAC having an input coupled to the selecting circuit and an DAC output which is analog representation of the digital output of the first or second counter, and wherein the converter and comparator circuit comprises:

a voltage inverting circuit having a first input coupled to the analog signal and a second input coupled to the reference, and an output; and a comparator having a first input coupled to the DAC output and a second input coupled to the output of the voltage inverting circuit, the comparator having an output which is high when a signal at its second input is greater than the DAC output and otherwise is low.

9. The peak and valley measuring circuit of claim 8, wherein the converter and comparator circuit further comprises first and second transmission gates, the first transmission gate coupled between the analog signal and the second input of the comparator of the converter and comparator circuit, and the second transmission gate coupled between the output of the voltage inverting circuit and the second input of the comparator of the converter and comparator circuit, the first transmission gate coupled to the counter select signal and responsive to close when the analog signal is greater than the reference and the second transmission gate coupled to the counter select signal and responsive to close when the analog signal is less than the reference.

10. A receiver comprising the peak and valley measuring circuit of claim 1, wherein the receiver further comprises a receiver circuit for demodulating a received signal and generating a demodulated signal, the receiver circuit coupled to the peak and valley measuring circuit whereby the demodulated signal corresponds to the analog signal whose peaks and valleys are measured by the peak and valley measuring circuit.

11. The receiver of claim 10, and further comprising a data limiter coupled to the peak and valley measuring circuit, the peak and valley measuring circuit generating a threshold for the data limiter.

12. A selective call receiver device comprising the receiver of claim 10, wherein the receiver circuit recovers a message portion and address portion of the signal, the selective call receiver device further comprising:

a memory for storing an address of the selective call receiver; and a decoder/controller coupled to the receiver circuit and the memory and responsive to the address portion of the signal demodulated by the receiver circuit to generate an alert and message when the address portion of the signal matches the address stored in the memory.

13. The receiver of claim 10, wherein the receiver circuit is a zero-intermediate frequency receiver circuit having automatic frequency control, the receiver circuit comprising:

a first pair of mixers and a first local oscillator for generating a first local oscillator signal coupled to the first pair of mixers, the first pair of mixers for mixing the received signal with the first local oscillator signal and generating as output a first mixed signal;

a second pair of mixers coupled to the output of the first pair of mixers, and a second local oscillator for generating a second local oscillator signal coupled to the second pair of mixers, the second pair of mixers generating as output an intermediate frequency signal;

a demodulator coupled to the output of the second pair of mixers for demodulating the intermediate frequency signal and generating said demodulated signal;

the peak and valley measuring circuit coupled to the output of the demodulator for measuring peaks and valleys in the demodulated signal; and a control module coupled to the peak and valley measuring circuit and responsive to the digital present count values representative of measurements of the peaks and valleys, respectively, determined by the peak and valley measuring circuit, for generating a frequency error signal which represents a change of a center frequency of the received signal with respect to a reference, the control module further coupled to the first local oscillator which is responsive to the frequency error signal to change a frequency of the first local oscillator signal generated by said first local oscillator.

14. The peak and valley measuring circuit of claim 1, and further comprising a microprocessor for providing a plurality of commands and a microprocessor clock signal for controlling operation of the first and second counters, wherein the selecting circuit comprises a state machine coupled to the microprocessor and responsive to the plurality of commands for coordinating coupling of the clock signal to the first counter or second counter with reference to the microprocessor clock signal.

15. The peak and valley measuring circuit of claim 14, wherein the first and second counters each comprises a reset input and a serial data output wherein the state machine comprises a first clock signal output coupled to the clock input of the first counter and a second clock signal output coupled to the clock input of the second counter, a reset signal output coupled to the reset input of the first and second counters, the state machine couples the clock signal through the first clock signal output to the first counter in coordination with the microprocessor clock signal in order to measure peaks of the analog signal and couples the clock signal through the second clock signal output to the second counter in coordination with the microprocessor clock signal in order to measure valleys of the analog signal.

16. The peak and valley measuring circuit of claim 15, wherein the first and second counters each comprises a shift clock input and a shift enable input, and the state machine comprises a shift clock output coupled to the shift clock inputs of the first and second counters and a shift enable output coupled to the shift enable inputs of the first and second counters, the first and second counters each functioning in a count mode when a signal on the shift enable output of the control state machine is low and the first and second counters each functioning in a serial shift mode when a signal on the shift enable output of the state machine is high.

17. The peak and valley measuring circuit of claim 16, wherein the first and second counters each comprises a serial data input and a serial data output, the serial data output of the first counter coupled to the serial data input of the second counter and the serial data output of the second counter being coupled to the serial data input of the first counter.

18. The peak and valley measuring circuit of claim 17, wherein the control state machine comprises a serial data input coupled to the serial data output of the second counter, a peak counter input coupled to the digital output of the first counter and valley counter input coupled to the digital output of the second counter, wherein the control state machine couples the microprocessor clock signal to the shift clock inputs of the first and second counters when the signal on the shift enable input is high so as to enable the control state machine to read data from the serial data output of the second counter.

19. A peak and valley measuring circuit suitable for detecting peaks and valleys of an analog signal, the peak and valley measuring circuit comprising:

a clock generator for generating a clock signal;

a reference source for providing a reference;

peak counter means having a clock input for receiving the clock signal and counting in response thereto, and providing a digital present count value at a digital output which is representative of a current measurement of a peak of the analog signal;

valley counter means having a clock input for receiving the clock signal and counting in response thereto, and providing a digital present count value at a digital output which is representative of a current measurement of a valley of the analog signal;

converter and comparator means having inputs coupled to the analog signal, to the reference and to the digital outputs of the first and second counters, the converter and comparator means comprising a single digital-to-analog converter (DAC) and generating a converter and comparator output which is an analog signal representative of the digital output of the peak counter means or the valley counter means; and selecting means having inputs coupled to the reference, to the analog signal, to the clock generator, to the digital outputs of the peak and valley counter means, and to the converter and comparator output, and having outputs coupled to the clock inputs of the peak and valley counter means, the selecting means selecting for operation the peak counter means when a level of the analog signal is greater than the reference, and selecting for operation the valley counter means when the level of the analog signal is less than the reference, the selecting means further controlling the peak counter means to count at a current peak only when the level of the analog signal is greater than a signal representative of the digital present count value of the first counter and controlling the valley counter means to count at a current valley only when the level of the analog signal is less than a signal representative of the digital present count value of the valley counter means.

20. The peak and valley measuring circuit of claim 19, wherein the DAC of the converter and comparator circuit is a current mode DAC which generates as output a DAC output current, wherein the converter and comparator means comprises:

voltage-to-current converter means having first and second inputs and an output, the first and second inputs of the voltage-to-current converter means being coupled to the analog signal and the reference, respectively, the voltage-to-current converter means generating as output an analog current based on a voltage difference between the analog signal and the reference; and a comparator having a first input coupled to the output of the voltage-to-current converter means and to the DAC output current, and a second input coupled to a voltage bias, and generating an output corresponding to the converter and comparator output.

* * * * *